July 19, 1955  D. WENSTROM  2,713,411
HAY STACKER
Filed Oct. 5, 1953  3 Sheets-Sheet 1
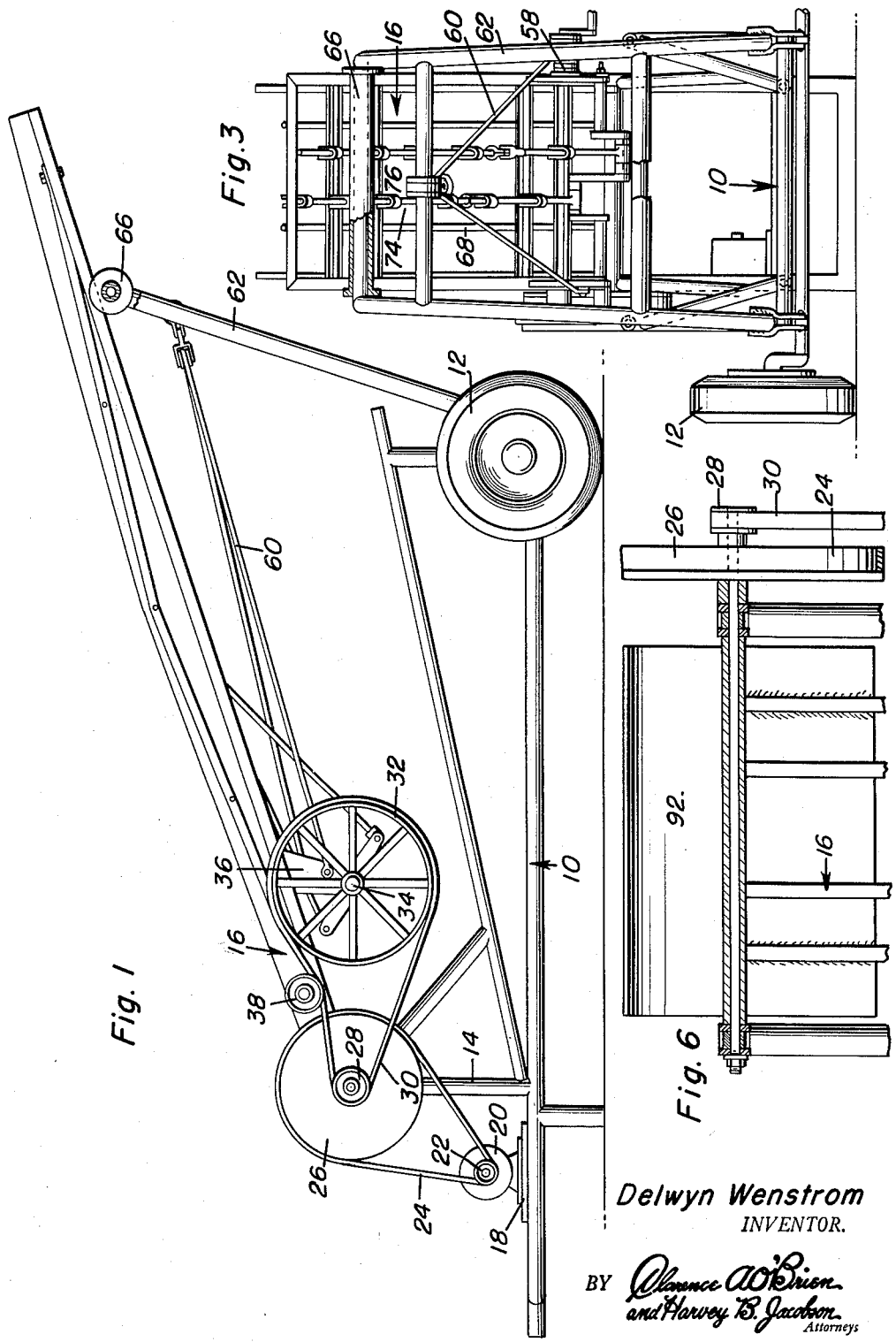
Delwyn Wenstrom
INVENTOR.

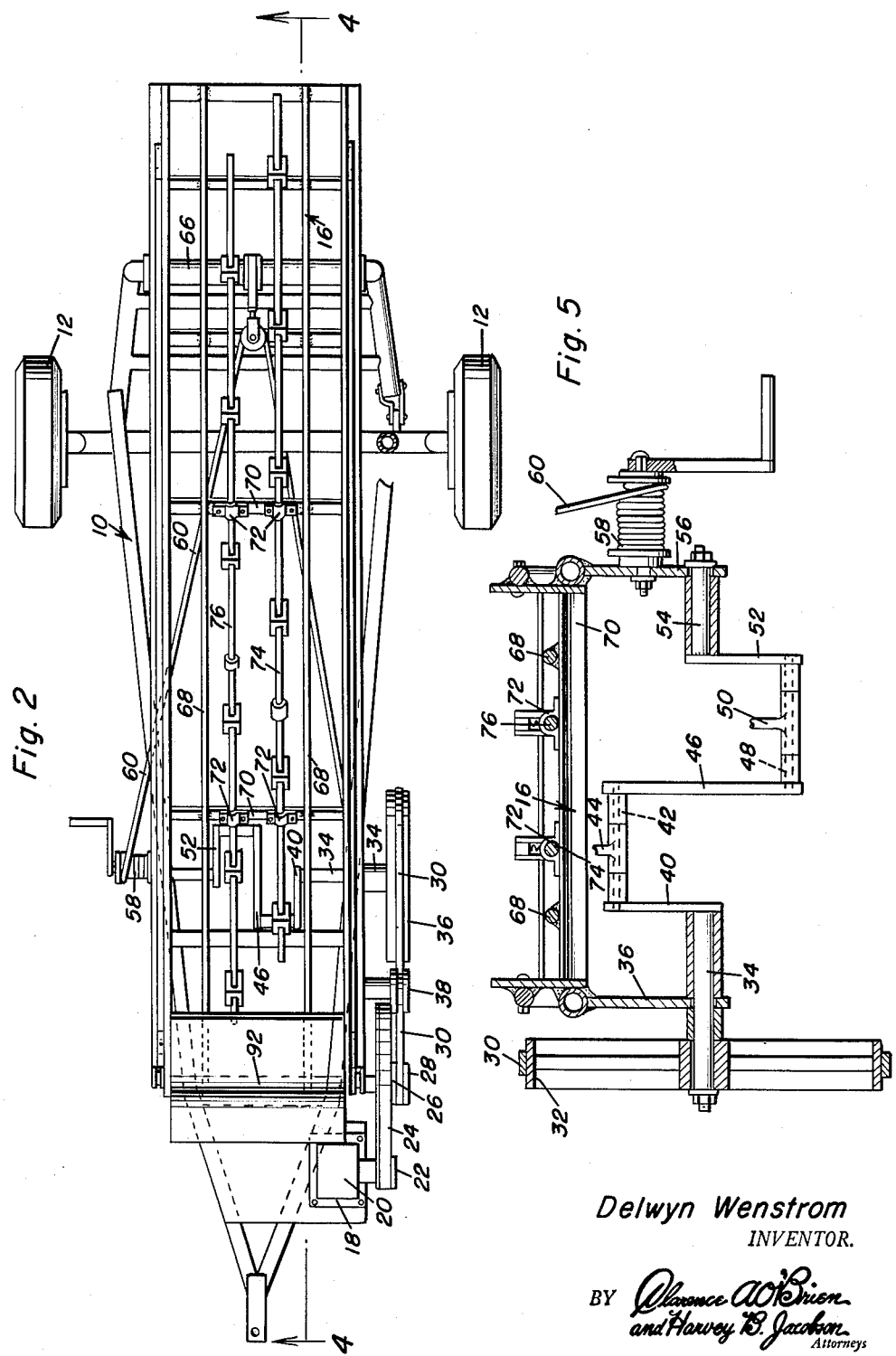

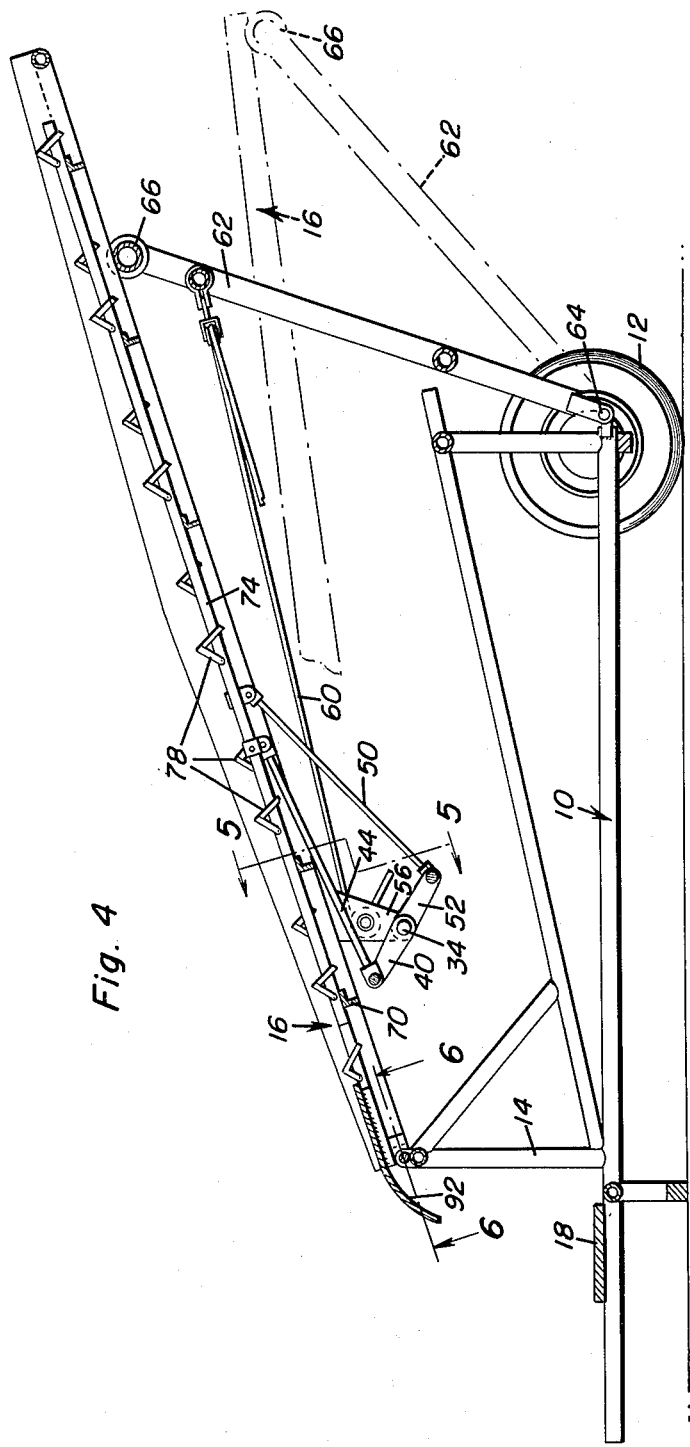
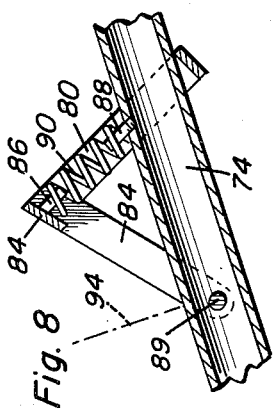
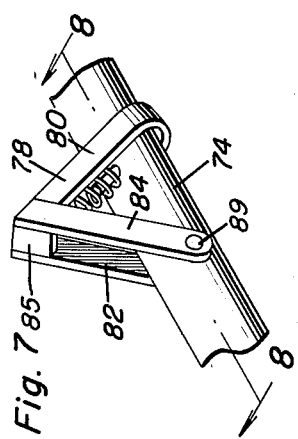
Delwyn Wenstrom
INVENTOR.

2,713,411
Patented July 19, 1955

2,713,411
HAY STACKER

Delwyn Wenstrom, Boyds, Wash.

Application October 5, 1953, Serial No. 383,992

3 Claims. (Cl. 198—122)

This invention relates to agricultural equipment and more particularly to a device for stacking bales of hay in a convenient manner.

The primary object of this invention resides in the provision of a hay stacker having novel means utilized for adjusting the angle of inclination of the conveyor rack to thereby enable bales of hay to be stacked in varying heights.

The construction of this invention features a frame having a rack pivotally attached thereto. There is also pivotally attached thereto a support member having rollers thereon for engaging the rack. A winch is mounted on the rack for drawing the support member into adjusted position so as to cause the rack to pivot in a desired manner to thereby vary the effective height of the rack through a considerable range.

Another novel feature of the invention resides in the push fingers utilized in the invention which enable movable members on the rack to propel the bales of hay upwardly along the rack.

Still further objects and features of this invention reside in the provision of a hay stacker that is strong and durable, simple in construction and manufacture, employing a minimum number of parts, and which is easy to operate.

These, together with the various ancillary objects and features of the invention which will become apparent as the following description proceeds, are attained by this hay stacker, a preferred embodiment of which has been illustrated in the accompanying drawings, by way of example only, wherein:

Figure 1 is a side elevational view of the hay stacker comprising the present invention;

Figure 2 is a top plan view of this piece of agricultural equipment;

Figure 3 is an end elevational view of the hay stacker;

Figure 4 is a vertical sectional view as taken along the plane of line 4—4 in Figure 2 and illustrating in phantom lines a further position of the hay stacker which can be attained;

Figure 5 is an enlarged sectional detail view as taken along the plane of line 5—5 in Figure 4 and illustrating the arrangement of crank elements for actuating the movable members of the rack;

Figure 6 is an enlarged sectional detail view as taken along the plane of line 6—6 in Figure 4;

Figure 7 is a partial perspective view illustrating the construction of the push fingers utilized in this invention; and Figure 8 is a sectional detail view as taken along the plane of line 8—8 in Figure 7 and further illustrating the construction of the push fingers.

With continuing reference to the accompanying drawings, wherein like reference numerals designate similar parts throughout the various views, reference numeral 10 generally designates a frame of suitable construction having ground engaging wheels 12 attached thereto for enabling the transportation of the hay stacker from one location to another. The frame 10 includes vertically extending standards 14 to which one end of a rack 16 is pivotally attached.

The frame 10 also has attached thereto a mounting plate 18 on which a motor 20 is secured, the motor 20 driving a shaft on which a pulley 22 is mounted. The pulley 22 drives an endless belt 24 entrained about a reduction pulley assembly 26 including the larger pulley on which the endless belt is entrained and a small pulley 28 on which an endless belt 30 is mounted. The endless belt is mounted and entrained about a drive pulley 32 mounted on a shaft 34 journaled in a bracket 36 depending from the rack 16. An idler pulley or belt tightener 38 is also provided. Secured to the shaft 34 is a first crank member 40 which carries a stub axle 42 on which a connecting rod 44 is rotatably mounted. A link 46 joins the stub axle 42 with a stub axle 48 on which a second connecting rod 50 is pivotally mounted. A second crank arm 52 has the axle 48 attached thereto and is also attached to a shaft 54 journaled in the bracket 56 depending from the side of the rack 16 opposite the bracket 36.

There is also mounted on the bracket 56 a winch 58 having a cable 60 entrained thereabout. The cable 60 is attached to a support member 62 which is pivotally mounted as at 64 on the frame 10. The end of the cable 60 is attached to the rack 16. Hence, upon actuation of the winch 58, the support member 62 will be pivoted about its pivot point, as at 64, so that the roller 66 mounted thereon will engage the underside of the rack 16 to tilt the rack 16 to a desired angle. Of course, when it is desired to stack bales of hay at a considerable height, it is necessary to pull the support member 62 inwardly toward the winch, while, when it is desired to stack the hay bales in a relatively lower position, the support member 62 may be released to the position as is shown in phantom lines in Figure 4.

The rack 16 is preferably constructed so as to include at least two longitudinally extending members, as at 68, which have welded or otherwise attached thereto transverse members 70 so as to form a substantially rigid and strong structure. The transverse members 70 carry bearings, as are indicated at 72, through which movable members 74 and 76 extend. The movable members 74 and 76 are cylindrical in shape and have attached thereto the connecting rods 44 and 50, respectively. Hence, upon rotation of the drive pulley 32, the movable members 74 and 76 will be reciprocated alternatively in view of the fact that the crank arms 40 and 52 are opposed to each other.

There are mounted on the movable members 74 and 76 a plurality of push fingers 78 each of which consists of a substantially U-shaped member 80 extending in embracing relationship about the movable members 74 and 76. Welded or otherwise attached to the U-shaped members 80 are legs 82 and 84 which have secured therebetween a stop plate 85. A pin 86 is secured to the stop plate 85 and likewise, a pin 88 is threaded or otherwise secured to the movable members 74 and 76 adjacent each of the U-shaped members 80. The legs 82 and 84 are rotatably mounted, as at 89, on the movable members 74 and 76. Coil springs 90 bias the stop plates 85 and the movable members 74 and 76 and are concentric with the pins 86 and 88.

There is welded or otherwise secured to the rack 16 a loading platform 92 having an arcuately downwardly extending lower edge for enabling the bales of hay to be more readily and easily positioned on the hay stacker.

Upon positioning a bale of hay on the loading platform 92 and pushing it upwardly so that the lowermost of the push fingers 78 can engage the hay bale, and with the motor 20 operating, the U-shaped members 80 of the push fingers 78 will engage the hay bale and push it upwardly upon the upward motion of each of the movable members 74 and 76. However, upon the downward motion of the movable members 74 and 76, the hay bale, such as indicated in phantom lines in Figure 8 and designated by the reference numeral 94, will engage the legs 82 and 84 and cam them downwardly, compressing the springs 90 to thereby permit passage thereover. This will continue until the hay bales have been passed from push finger to push finger, at which time they will have traversed the entire length of the rack.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A baled hay stacker comprising a frame, an elevating rack having one end pivotally attached to said frame, an adjustable support pivotally attached to said frame and having a roller thereon engaging said rack, and means for adjusting the position of said support to pivotally adjust the inclination of said rack, said rack including a plurality of spaced transverse members interconnected by spaced longitudinally extending members, movable members supported by said transverse members, and means for actuating said movable members secured thereto, each of said movable members having a plurality of push fingers attached thereto, said push fingers including substantially U-shaped members positioned in embracing relationship about a movable member, pairs of legs secured to said U-shaped members extending angularly relative thereto, said legs being pivoted to a movable member, stop plates secured to and extending between the legs of said pairs of legs, pins carried by said stop plates and said movable members, and springs concentrically disposed over said pins biasing said stop plates and said movable members.

2. A baled hay stacker comprising a frame, an elevating rack having one end pivotally attached to said frame, an adjustable support pivotally attached to said frame and having a roller thereon engaging said rack, and means for adjusting the position of said support to pivotally adjust the inclination of said rack, said rack including a plurality of spaced transverse members interconnected by spaced longitudinally extending members, movable members supported by said transverse members, a bracket depending from said rack, a shaft journaled in said bracket, a pair of opposed crank arms secured on said shaft, and connecting rods terminally pivotally secured to said movable members and to said crank arms for alternative reciprocating of said movable members, each of said movable members having a plurality of push fingers attached thereto, said push fingers including substantially U-shaped members positioned in embracing relationship about a movable member, pairs of legs secured to said U-shaped members extending angularly relative thereto, said legs being pivoted to a movable member, stop plates secured to and extending between the legs of said pairs of legs, pins carried by said stop plates and said movable members, and springs concentrically disposed over said pins biasing said stop plates and said movable members.

3. A baled hay stacker comprising a frame, an elevating rack having one end pivotally attached to said frame, an adjustable support pivotally attached to said frame and having a roller thereon engaging said rack, and means for adjusting the position of said support to pivotally adjust the inclination of said rack, said means including a winch carried by said rack, and a cable secured on said winch attached to said support, said rack including a plurality of spaced transverse members interconnected by spaced longitudinally extending members, bearings attached to said transverse members, movable members slidably mounted in said bearings, a bracket depending from said rack, a shaft journaled in said bracket, a pair of opposed crank arms secured on said shaft, and connecting rods terminally pivotally secured to said movable members and to said crank arms for alternative reciprocating of said movable members, each of said movable members having a plurality of push fingers attached thereto, said push fingers including substantially U-shaped members positioned in embracing relationship about a movable member, pairs of legs secured to said U-shaped members extending angularly relative thereto, said legs being pivoted to a movable member, stop plates secured to and extending between the legs of said pairs of legs, pins carried by said stop plates and said movable members, and springs concentrically disposed over said pins biasing said stop plates and said movable members.

References Cited in the file of this patent

UNITED STATES PATENTS

| | | |
|---|---|---|
| 191,985 | Marsters | June 12, 1877 |
| 668,083 | Bogel | Feb. 12, 1901 |
| 1,048,124 | Ashworth | Dec. 24, 1912 |
| 1,204,360 | Killinger et al. | Nov. 7, 1916 |
| 2,392,340 | Smith | Jan. 8, 1946 |
| 2,459,358 | Birkhead | Jan. 18, 1949 |
| 2,549,990 | Skelton | Apr. 24, 1951 |